United States Patent
Horne et al.

[11] Patent Number: 5,852,473
[45] Date of Patent: Dec. 22, 1998

[54] 3-2 PULLDOWN DETECTOR

[75] Inventors: Caspar Horne, Santa Clara, Calif.; Ali Tabatabai, Beaverton, Oreg.

[73] Assignee: Tektronix, Inc., Wilsonville, Oreg.

[21] Appl. No.: 603,302

[22] Filed: Feb. 20, 1996

[51] Int. Cl.[6] .............................. H04N 5/46; H04N 7/01
[52] U.S. Cl. .................... 348/558; 348/459; 348/911
[58] Field of Search ................... 348/558, 459, 348/526, 700, 441, 911; H04N 5/46, 7/01

[56] References Cited

U.S. PATENT DOCUMENTS

| | | | |
|---|---|---|---|
| 5,398,071 | 3/1995 | Gove | 348/558 |
| 5,508,750 | 4/1996 | Hewlett | 348/558 |
| 5,600,376 | 2/1997 | Casavant | 348/558 |
| 5,606,373 | 2/1997 | Dopp | 348/459 |

Primary Examiner—Sherrie Hsia
Attorney, Agent, or Firm—Francis I. Gray

[57] ABSTRACT

A 3-2 pulldown detector for a video compression encoder initially converts each frame of an input video signal that includes converted film material as well as original video material into top and bottom fields. Consecutive fields from the top and bottom fields are then input to respective sum of absolute difference circuits, the outputs of which are subtracted from each other to produce a difference signal. The difference signal is processed to remove spikes that represent scene changes and to generate a flag signal during the periods of the input video signal when the converted film material is present. The flag signal is then used by a frame rate reduction circuit to eliminate the repeated fields in the converted film material prior to input to a video encoder that outputs a compressed video signal.

8 Claims, 2 Drawing Sheets

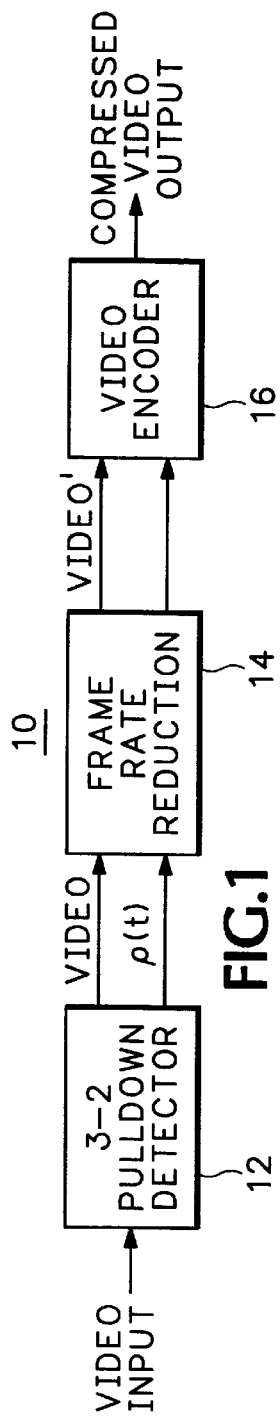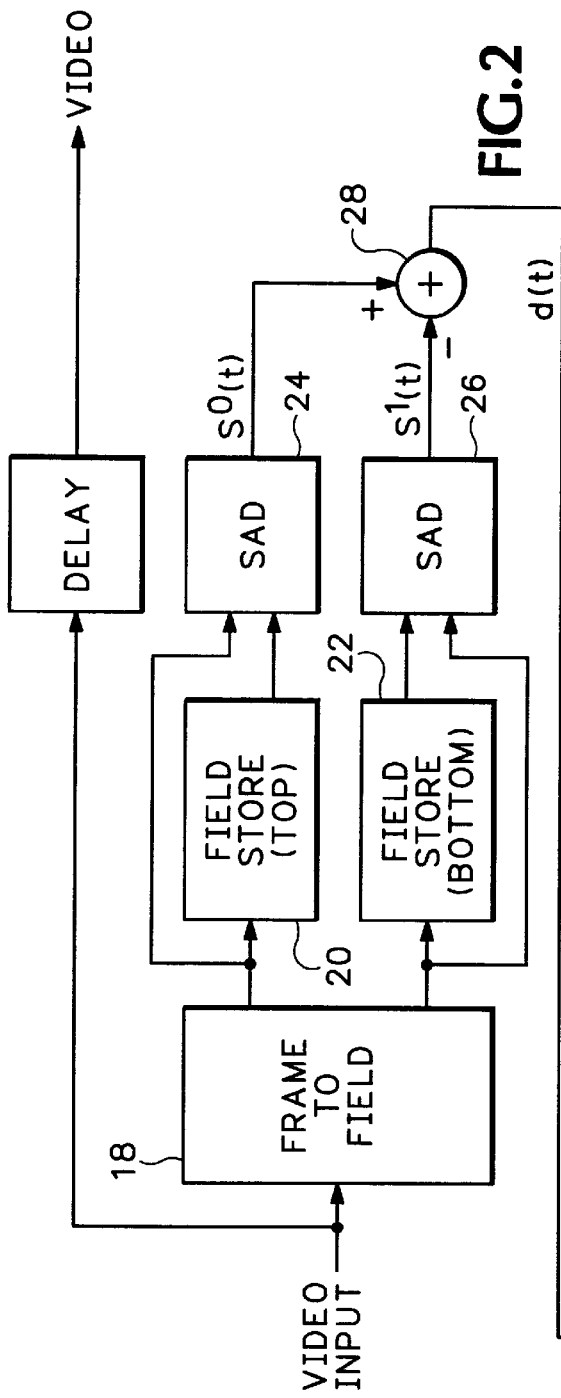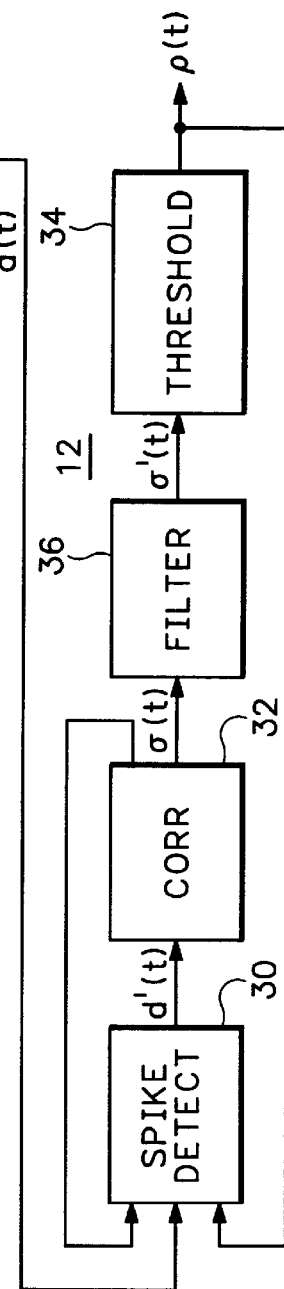

3-2 PULLDOWN DETECTOR

BACKGROUND OF THE INVENTION

The present invention relates to video data compression, and more particularly to a 3-2 pulldown detector for Improving the efficiency of subsequent video data compression.

The second phase of the Motion Pictures Expert Group (MPEG-2) is primarily aimed at coding high resolution video signals with high quality. The improvements made with respect to the first phase (MPEG-1) are numerous, with one of the key characteristics being the improved coding efficiency of interlaced material. This makes it very attractive to introduce digital television systems based upon this standard. The distribution of digital video is attractive for cable television companies, since the reduced bandwidth of the compressed video signals allows for more channels into the home without augmenting current channel capacity. Similar reasons make it attractive to encode studio quality analog video material in digital form, using the MPEG2 standard.

A considerable amount of video material is in the form of progressive film material with an original frame rate of 24 frames/second mixed with interlaced video material with a frame rate of 30 frames/second, i.e., movies mixed with commercials. The frame rate conversion of the film material is usually done by repeating two fields out of every four frames of film using a 3-2 pulldown technique so that the film material may be used as "interlaced" video material with a frame rate of 30 frames/second, and thus can be mixed together with other video material easily.

Often the 3-2 pulldown technique is done in an analog fashion by rescanning the repeated fields. In this case the picture content of the repeated fields is the same, but the fields are not identical since they are corrupted by a considerable amount of non-identical noise. Encoding such a sequence is not very efficient, since the coder is coding noise 20% of the time. Clearly the coding efficiency may be improved by removing the repeating fields in a preprocessing stage and encoding the picture material as a progressive sequence with a frame rate of 24 frames/second instead of an interlaced video sequence with a frame rate of 30 frames/second. To exploit this redundancy in video material obtained by the 3-2 pulldown technique without affecting the original interlaced video material, an automatic detection of video material obtained by the 3-2 pulldown technique is desired.

Video material obtained by 3-2 pulldown may be recognized relatively easily by the human eye. This is because the frames that contain the repeated field show interlace, or motion, artifacts. One method that could be applied to detect this is similar to the one described in the MPEG-2 *Test Model* 3 for field/frame discrete cosine transform (DCT) coding decisions on a block level. Here the squared sum of the differences between lines t and t+2 (var 1) is compared with the squared sum of the differences between lines t and t+1 (var 2), both computed on a block of a single frame where t is the line number. Field DCT coding is selected if the former measure (var 1) is less than the latter measure (var 2), under the assumption that this is a measure of the amount of interlace. A similar measure applied to frames could be used to detect frames that have interlace artifacts versus those that do not. The main drawback to this method is that the measure fails to detect anything useful when more than a very small amount of noise is present.

Typically correlation between repeated fields is higher than the correlation between non-repeated fields. Thus inter-field correlation could be used to detect 3-2 pulldown. However this correlation is only marginally higher, typically only on the order of a few percent or less. Furthermore the correlation between temporally adjacent fields tends to be very high and it fluctuates depending upon the type of video material. Typical inter-field correlation values are within the range of 0.70–0.99. Thus the variation across a range of video material is much higher than the difference in correlation between repeated fields and non-repeated fields in a single video signal obtained by 3-2 pulldown. It is clearly very difficult to select a reliable threshold for 3-2 pulldown detection based directly on this measure.

What is desired is a 3-2 pulldown detector that makes use of the higher correlation between repeated fields than between non-repeated fields, but which is more reliable than the prior art.

SUMMARY OF THE INVENTION

Accordingly the present invention provides a 3-2 pulldown detector that uses the higher correlation between repeated fields than between non-repeated fields. Each frame of a video signal to be compressed that has both converted film material and original video material is separated into respective top and bottom fields. Current and prior top and bottom fields are input to respective sum of absolute difference circuits, the outputs of which are then subtracted to produce a difference signal. The difference signal is input to a spike detector which detects and filters out spikes caused by scene changes, and which detects the maximum and minimum values of the difference signal over the last five frames. These maximum and minimum values are further correlated and processed to generate a flag signal, indicative of 3-2 pulldown material. The repeated field in the 3-2 pulldown material is deleted and converted by a frame rate reduction circuit to 24 frame/second material prior to compression by an encoder.

The objects, advantages and other novel features of the present invention are apparent from the following detailed description when read in conjunction with the appended claims and attached drawing.

BRIEF DESCRIPTION OF THE DRAWING

FIG. 1 is a block diagram of an encoder system that uses a 3-2 pulldown detector according to the present invention.

FIG. 2 is a block diagram of the 3-2 pulldown detector according to the present invention.

DESCRIPTION OF THE PREFERRED EMBODIMENT

Figure 3:
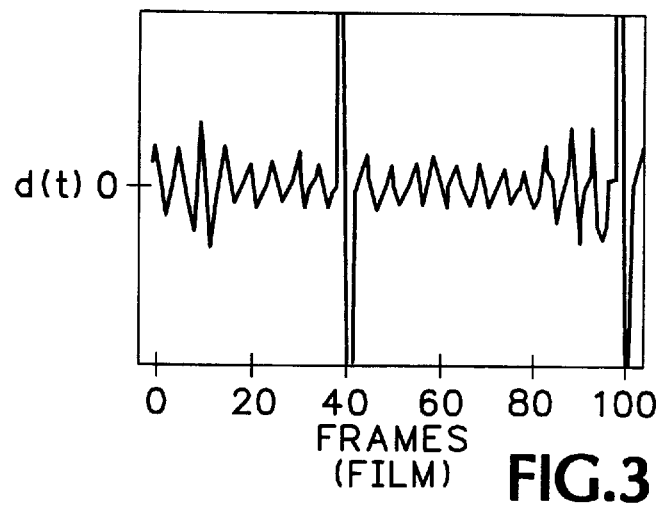
FIG. 3 is a graphic view of a difference signal for a converted film material video signal according to the present invention.

Referring now to FIG. 1 an encoder system 10 is shown having a pulldown detector 12 at the input. A video signal that includes converted film material and original video material is input to the pulldown detector 12. A frame rate reduction circuit 14 reduces the frame rate of the converted film material to 24 frames/second by removing the repeated fields indicated by the 3-2 pulldown detector 12 and by proper rearrangement of the remaining fields. The resulting video signal is input to a video encoder 16 to produce a compressed video signal output.

The pulldown detector 12, as shown in FIG. 2, has a frame-to-field conversion input circuit 18 which separates each frame of the input video signal into its two fields, the top field and bottom field. The top and bottom fields are stored in respective field store memories 20, 22. Current top and bottom fields are input to respective sum of absolute difference (SAD) circuits 24, 26 together with the corresponding previous top and bottom fields from the field store memories 20, 22. Similar measures could be used in lieu of SAD. Denoting the SAD for field f at time t by $s^f(t)$, then $$s^f(t) = \Sigma \| p^f_{i,j}(t) - p^f_{i,j}(t-1) \|$$

with i,j in the index set of field f. To make an accurate and reliable 3-2 pulldown detection possible the outputs of the two SAD circuits 24, 26 are input to a subtraction circuit 28 to produce a new signal, d(t), defined as $$d(t) = s^0(t) - s^1(t)$$

The difference signal d(t) is input to a spike detection circuit 30. The spike detection circuit 30 improves the reliability of detection by using an adaptive non-linear filter, as is described below. Occasionally in video material obtained by 3-2 pulldown, scene changes occur within a frame. In these cases the first field of the frame contains the end of one scene, while the last field contains the beginning of another scene. These scene changes may be caused by editing of the video material, but may also be caused by scene changes in the original progressive film material. Such a scene change can cause reliability problems in the detection part that follows because it gives very large values, i.e., a spike, in the difference signal d(t). The function of the spike detector circuit 30 is to detect and filter out these spikes.

Figure 4:
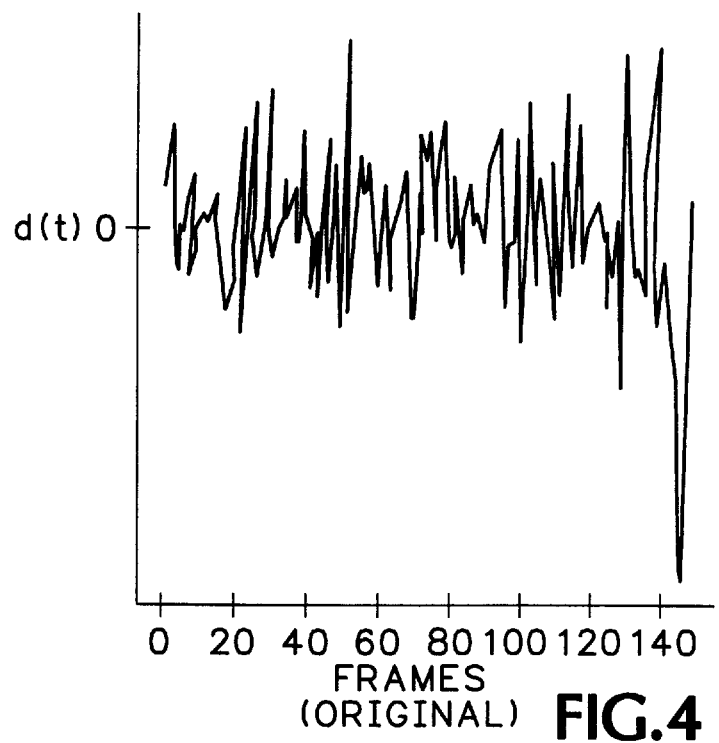
FIG. 4 is a graphic view of a difference signal for an original video material video signal according to the present invention.

In the spike detector circuit 30 the maximum and minimum values of d(t) are detected over the last five frames, since d(t) has repeated minima at the repeated field spaced five frames apart, as shown in FIG. 3, for converted film material as opposed to original video material, as shown in FIG. 4. A running average is maintained of these minimum and maximum values, denoted by avMax and avMin. This is done by computing the median values over the last n values, where n is typically 3, or by a running average of the type $$\text{newAverage} = (1-\alpha)(\text{oldAverage}) + \alpha(\text{newValue})$$

Input values of d(t) are then compared with these values, and if d(t) is larger than $\delta_1 \times (\text{avMax})$ or smaller than $\delta_1 \times (\text{avMin})$, the value of d(t) is replaced with the value of d(t−5). This signal is available from a correlation circuit 32. A typical value of $\delta_1$ is 5. To prevent false detection the spike detection circuit 30 operates only under the condition that video material obtained by 3-2 pulldown has been detected, as indicated by a signal coming back from a threshold detector 34. The output signal from the spike detection circuit 30 is designated by d'(t), and is the input to the correlation circuit 32.

The detection of 3-2 pulldown is based on the regularity of the difference signal d(t). To detect this regularity a normalized auto-correlation measure, similar to the linear correlation coefficient of the signal d'(t), is determined and denoted as $c_z(t)$:

$$c_z(t) = \frac{\Sigma(d'(t) - m_0)(d'(t-z) - m_z)}{\sqrt{\Sigma(d'(t) - m_0)^2} \sqrt{\Sigma(d'(t-z) - m_z)^2}}$$

with $m_z$ being the average value of d'(t) over a small predetermined time window, with a typical value of 10 frames. For video material obtained by 3-2 pulldown, the signal $c_z(t)$ is large and positive for z=5, and somewhat large and negative for z=2 and 3. For video material that is original interlaced 30 frames/second, these values are smaller and often differ in sign.

To distinguish between the two different video signals, 3-2 pulldown and original video, signal σ(t) is determined using a predetermined threshold $\delta_2$:

$$\sigma(t) = \begin{cases} c_5(t) & \text{if } c_5(t) < \delta_2 \\ c_5(t) - c_2(t) - c_3(t) & \text{otherwise} \end{cases}$$

The threshold $\delta_2$ is chosen to reduce the value of σ(t) for difference signals that have a low auto-correlation for a lag of 5, but that exhibit strong negative auto-correlation of lag 2 and 3. These signals are most likely not obtained by 3-2 pulldown, but are original interlaced video material. A typical value for $\delta_2$ is 0.6. This combining of the signals increases the reliability of the detection.

To further improve the detection some post-processing is done on σ(t) by applying a short linear lowpass filter 36, or short median filter. To filter out large peaks that are relatively short, a median filter 36 with a length 5 is used. The output is a filtered signal σ'(t). Now a threshold $\delta_3$ is chosen for the threshold detector 34 to detect video obtained by 3-2 pulldown to produce a flag signal ρ(t) which has a value of 1 when video obtained by 3-2 pulldown is detected (if σ'(t) > $\delta_3$), and is otherwise 0. A typical value of $\delta_3$ is 1.

Once the presence of video material obtained by 3-2 pulldown is detected, the material may be converted by the frame rate reduction circuit 14 from interlaced 30 frames/second to progressive 24 frames/second by removing appropriate fields. Basically for each 5 incoming frames a new video signal is constructed containing only 4 frames. From the incoming video signal 3 frames are progressive and 2 frames contain interlaced material obtained by field repeating, and these 2 frames may be combined into 1 progressive frame. Combined with the 3 progressive frames, this results in the output video signal having 4 progressive frames. The difference signal d(t) together with the spike detection circuit 30 are used to detect which 2 frames are to be combined. The interlace artifacts and the 2 frames to be combined in to 1 occur at the location where the maximum and minimum of d(t) taken over 5 samples are spaced 2 samples apart. If the index where the maximum value occurs is maxInd and where the minimum occurs is minInd taken over a window of five frames, then the indices of the 2 frames with interlace artifacts with respect to the beginning of the window, denoted by $p_1$ and $p_2$, are determined as follows:

$$p_1 = \begin{cases} (\text{minInd} + \text{maxInd})/2 & \text{if (minInd + maxInd) is even} \\ (\text{minInd} + \text{maxInd} + 5)/2 & \text{otherwise} \end{cases}$$

with $p_1$ taken with modulo 5, and $$p_2 = p_1 + 1$$

These two frames are combined by leaving out the repeated fields. The other three frames are copied directly into the output signal provided that the spike detector flag is not set. If the spike detector flag is set, a scene change has occurred within a frame, and the frame needs to be replaced with the previous, or future, frame to obtain the desired progressive video material. The progressive video material from the frame rate reduction circuit 14 is then input to the encoder 16 to produce the desired compressed video signal output.

Thus the present invention provides a reliable 3-2 pulldown detector that generates a difference signal as the difference between the sum of absolute differences for the current and prior top and bottom fields of an input video signal, which difference signal is then processed to generate a flag signal indicative of the presence of converted film material in the video signal.

What is claimed is:

1. A 3-2 pulldown detector comprising:

means for converting each frame of an input video signal which includes converted film material into respective top and bottom fields;

means for obtaining a sum of absolute differences between consecutive fields for each of the top and bottom fields respectively;

means for subtracting the sums of the absolute differences to produce a difference signal; and means for processing the difference signal to produce a flag signal during a period when converted film material is included in the input video signal.

2. The 3-2 pulldown detector as recited in claim 1 wherein the processing means includes means for detecting and filtering out from the difference signal spikes that represent scene changes in the input video signal.

3. An apparatus for compressing an input video signal that includes converted film material comprising:

a 3-2 pulldown detector that includes means for converting each frame of the input video signal into respective top and bottom fields, means for obtaining a sum of absolute differences between consecutive fields for each of the top and bottom fields respectively, means for subtracting the sums of the absolute differences to produce a difference signal, and means for processing the difference signal to produce a flag signal during a period when converted film material is included in the input video signal;

means for deleting repeated fields in the input video signal when the flag signal indicates the presence of converted film material in the input video signal to produce a resulting video signal; and means for encoding the resulting video signal from the deleting means to produce a compressed video signal.

4. The apparatus as recited in claim 3 wherein the processing means includes means for detecting and filtering out from the difference signal spikes that represent scene changes in the input video signal.

5. A method of detecting converted film material in an input video signal comprising the steps of:

converting each frame of the input video signal into respective top and bottom fields;

obtaining a sum of absolute differences between consecutive fields for each of the top and bottom fields respectively;

subtracting the sums of the absolute differences to produce a difference signal; and processing the difference signal to produce a flag signal during a period when converted film material is included in the input video signal.

6. The method as recited in claim 5 wherein the processing step includes the step of detecting and filtering out from the difference signal spikes that represent scene changes in the input video signal.

7. A method of compressing an input video signal that includes converted film material comprising the steps of:

converting each frame of the input video signal into respective top and bottom fields;

obtaining a sum of absolute differences between consecutive fields for each of the top and bottom fields respectively;

subtracting the sums of the absolute differences to produce a difference signal;

processing the difference signal to produce a flag signal during a period when converted film material is included in the input video signal;

deleting repeated fields in the input video signal when the flag signal indicates the presence of converted film material in the input video signal to produce a resulting video signal; and encoding the resulting video signal from the deleting means to produce a compressed video signal.

8. The method as recited in claim 7 wherein the processing step includes the step of detecting and filtering out from the difference signal spikes that represent scene changes in the input video signal.

* * * * *